(12) United States Patent
Lin

(10) Patent No.: US 8,222,575 B2
(45) Date of Patent: Jul. 17, 2012

(54) ELECTRIC GRILL

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 547 days.

(21) Appl. No.: 12/575,534

(22) Filed: Oct. 8, 2009

(65) Prior Publication Data

US 2011/0084057 A1   Apr. 14, 2011

(51) Int. Cl.
*H05B 3/68* (2006.01)
(52) U.S. Cl. .................................................... 219/450.1
(58) Field of Classification Search ................ 219/450.1
See application file for complete search history.

(56) References Cited

U.S. PATENT DOCUMENTS

| 6,000,388 A * | 12/1999 | Andress ..................... 126/25 R |
| 2005/0205545 A1* | 9/2005 | Siegel et al. .................. 219/386 |
| 2006/0049164 A1* | 3/2006 | Bryan .......................... 219/386 |
| 2006/0289452 A1* | 12/2006 | Lequy ...................... 219/452.13 |
| 2012/0103319 * | 5/2012 | Sheridan ...................... 126/181 |

* cited by examiner

*Primary Examiner* — Colleen Matthews

(57) ABSTRACT

An electric grill includes a base having a compartment in an upper side thereof. A control device is mounted to the base and includes a first electrical coupling mechanism adapted to be electrically connected to an external power source by a power cable. A grill plate is mounted above the compartment of the base and removable from the base. An electric heating device is mounted to the grill plate. The electric heating device includes an electric heating tube and a second electrical coupling mechanism electrically connected to the electric heating tube. The electric heating tube is non-conductive when the grill plate is removed from the base. When the grill plate is mounted on the base, the second electrical coupling mechanism is in electrical connection with the first electrical coupling mechanism, and the electric heating tube is controllable by the control device to be conductive.

5 Claims, 5 Drawing Sheets

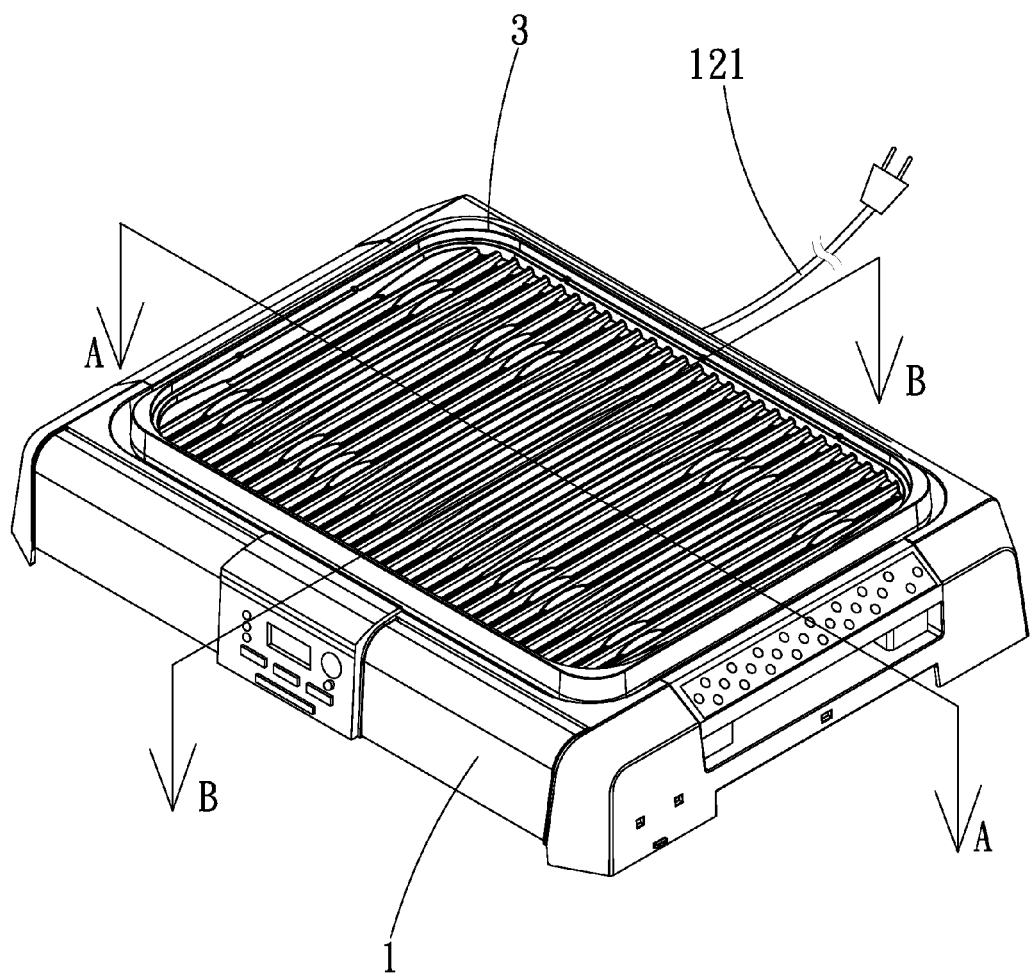
F I G . 3

B-B

ELECTRIC GRILL

BACKGROUND OF THE INVENTION

1. Field of the Invention

The present invention relates to an electric grill and, more particularly, to an electric grill that is safer and easier to use.

2. Description of the Related Art

Conventional electric grills generally include a base, an electric heating tube mounted in the base and heated by electricity, a grill plate placed above the electric heating element for barbecue purposes or the like, and a separate conduction control device. The electric heating tube includes a terminal extending beyond the base. The grill can be removed from the base for cleaning purposes. The conduction control device includes a power cable with a plug for connection with a regular power source. The conduction control device further includes a controller having a switch and a temperature control circuit. The conduction control device further includes a terminal for coupling with the terminal of the electric heating tube to power the electric heating tube for heating the food placed on the grill plate. However, when a user removes the grill plate from the base, the electric heating tube is still in a heating condition, leading to the risk of injury to the user. Furthermore, the user has to carry the conduction control device separate from the other components of the electric grill, which is troublesome. Furthermore, the electric grill can not work when the conduction control device is lost.

Thus, a need exists for an electric grill and, more particularly, to an electric grill that is safer and easier to use.

BRIEF SUMMARY OF THE INVENTION

The present invention solves this need and other problems in the field of safety barbequing by providing, in a preferred form, an electric grill including a base having a compartment in an upper side thereof. A control device is mounted to the base and includes a first electrical coupling mechanism adapted to be electrically connected to an external power source by a power cable. A grill plate is mounted above the compartment of the base and removable from the base. An electric heating device is mounted to the grill plate. The electric heating device includes an electric heating tube and a second electrical coupling mechanism electrically connected to the electric heating tube. The electric heating tube is nonconductive when the grill plate is removed from the base. When the grill plate is mounted on the base, the second electrical coupling mechanism is in electrical connection with the first electrical coupling mechanism, and the electric heating tube is controllable by the control device to be conductive.

In the most preferred form, the control device includes a circuit board having a control circuit. The first electrical coupling mechanism is at least partially mounted above a bottom wall of the compartment of the base. The grill plate includes an underside to which the electric heating device is mounted. The underside of the grill plate includes a groove receiving the electric heating tube. The second electrical coupling mechanism includes a partitioning board that covers the first and second electrical coupling mechanisms when the grill plate is mounted to the base and when the second electrical coupling mechanism is in electrical connection with the first electrical coupling mechanism.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 3 shows a perspective view of the electric grill of FIG. 1 with a cover of the electric grill removed for clarity.

Figure 1:
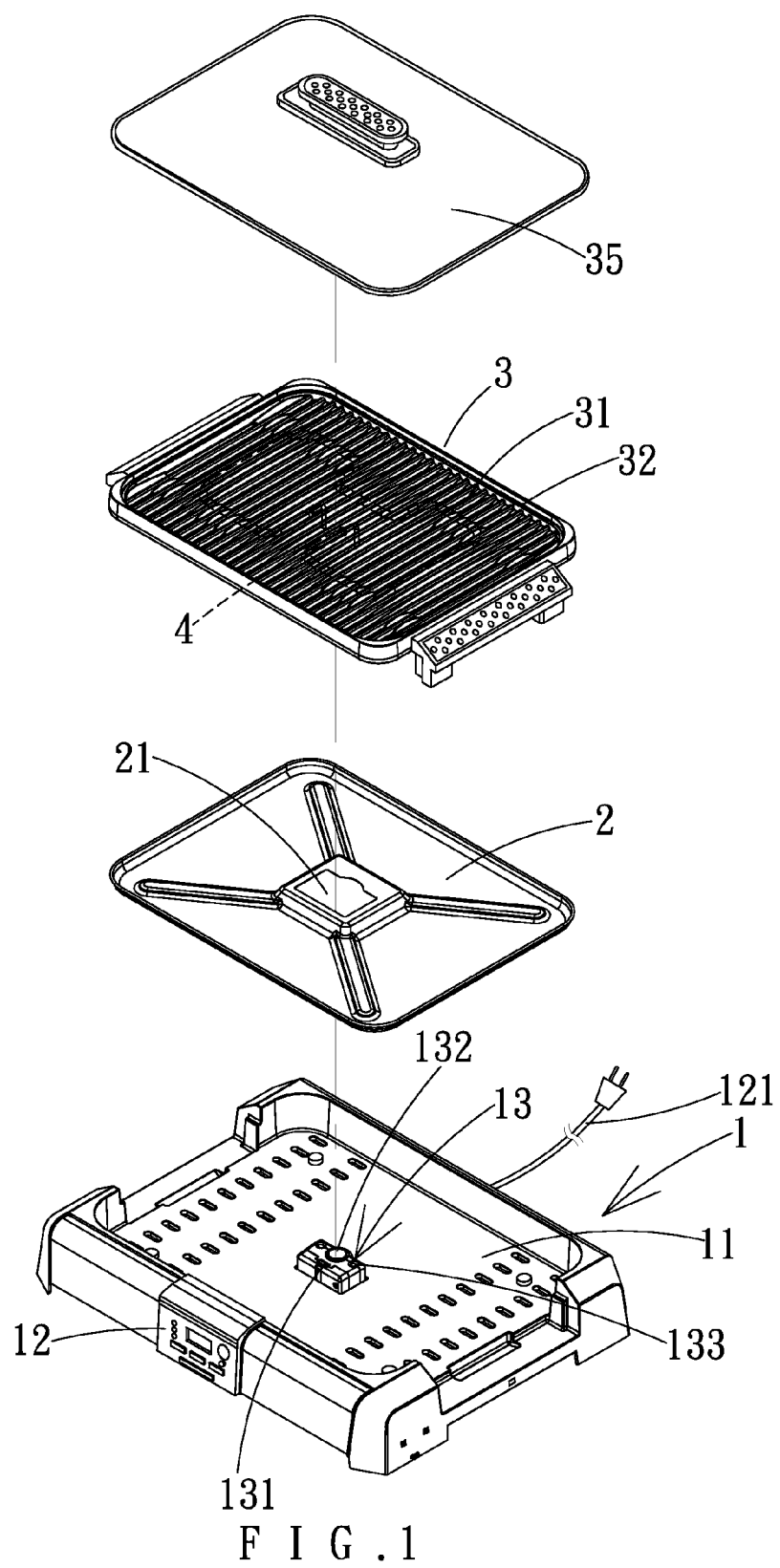
FIG. 1 shows an exploded, perspective view of an electric grill according to the preferred teachings of the present invention.
Figure 2:
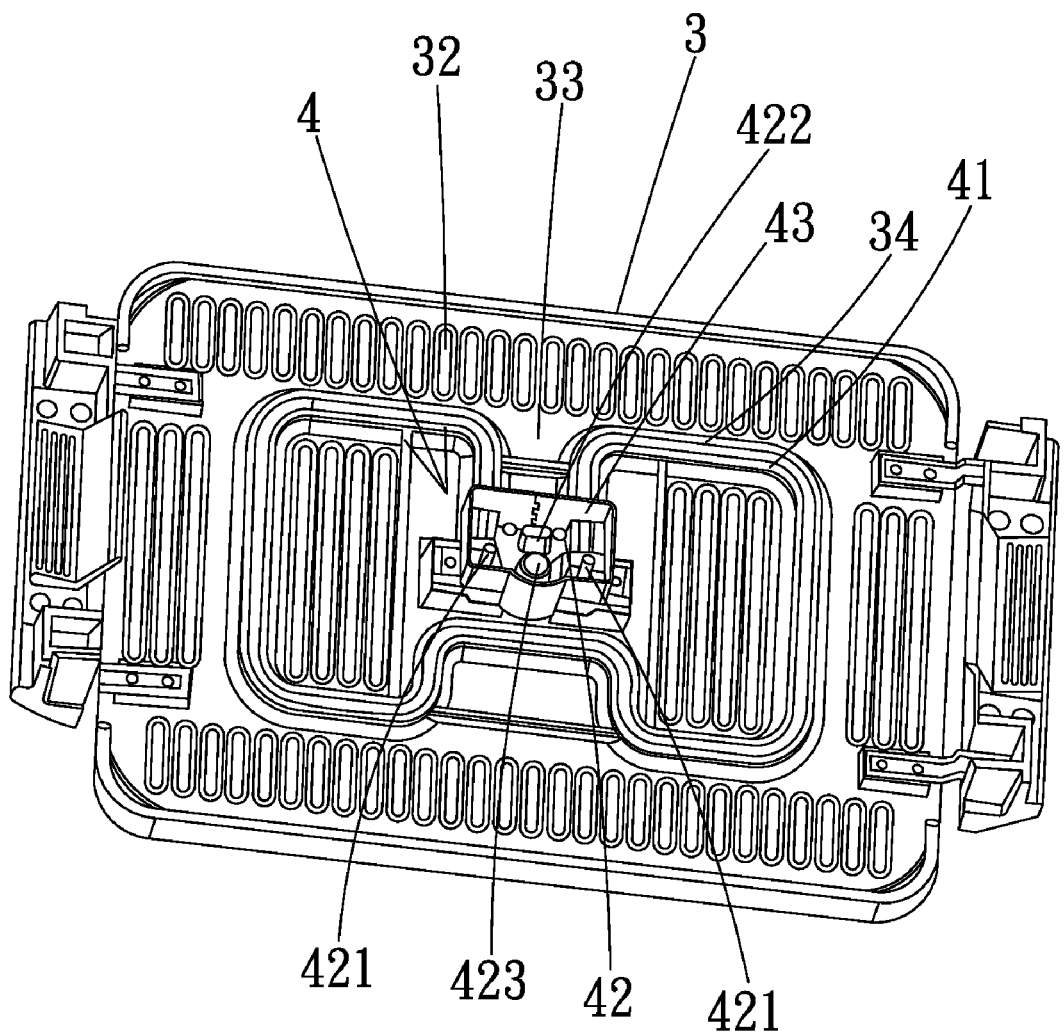
FIG. 2 shows a grill plate and an electric device of the electric grill of FIG. 1.
Figure 4:
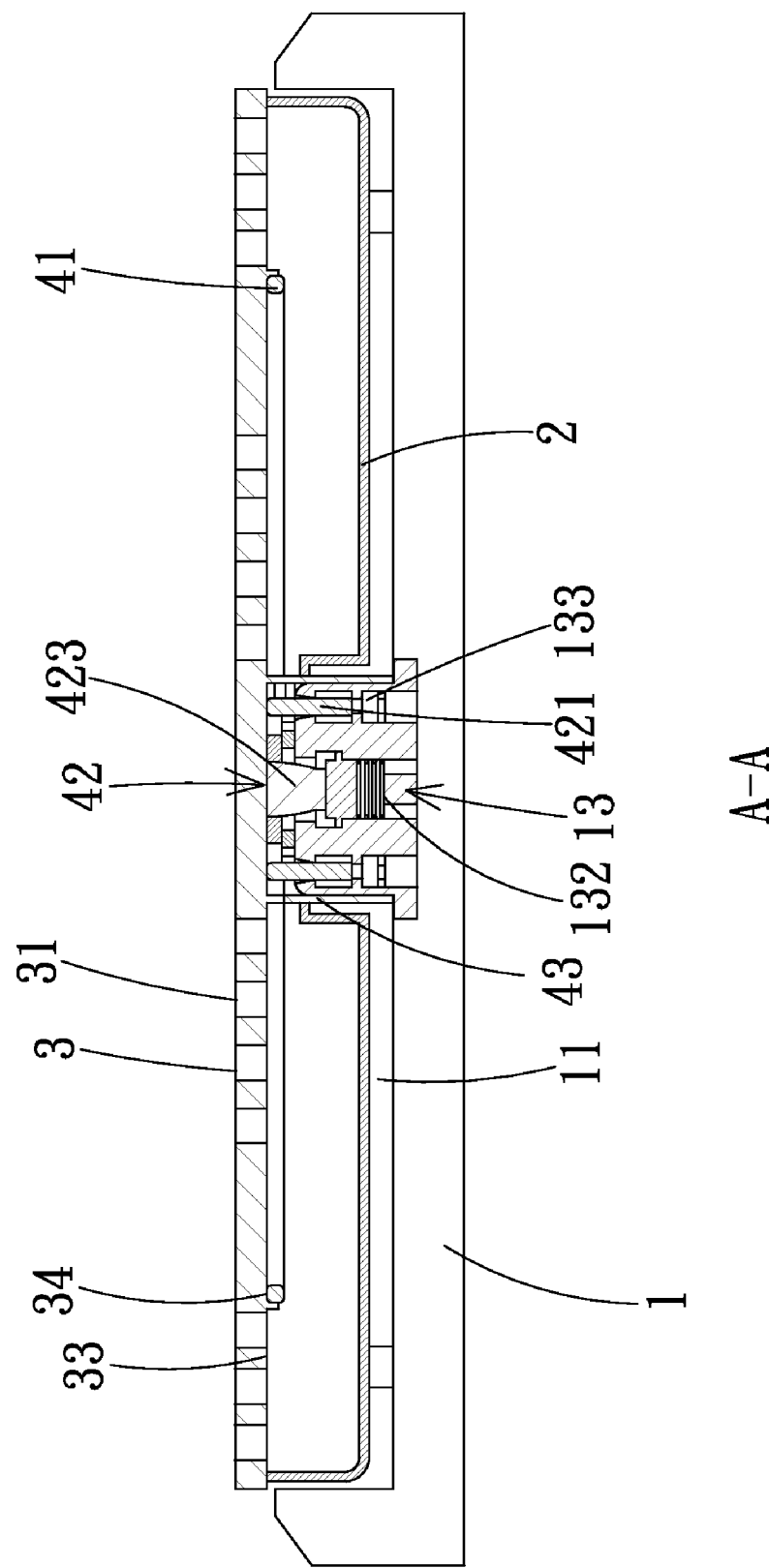
FIG. 4 shows a cross sectional view of the electric grill of FIG. 1 according to section line A-A of FIG. 3.
Figure 5:
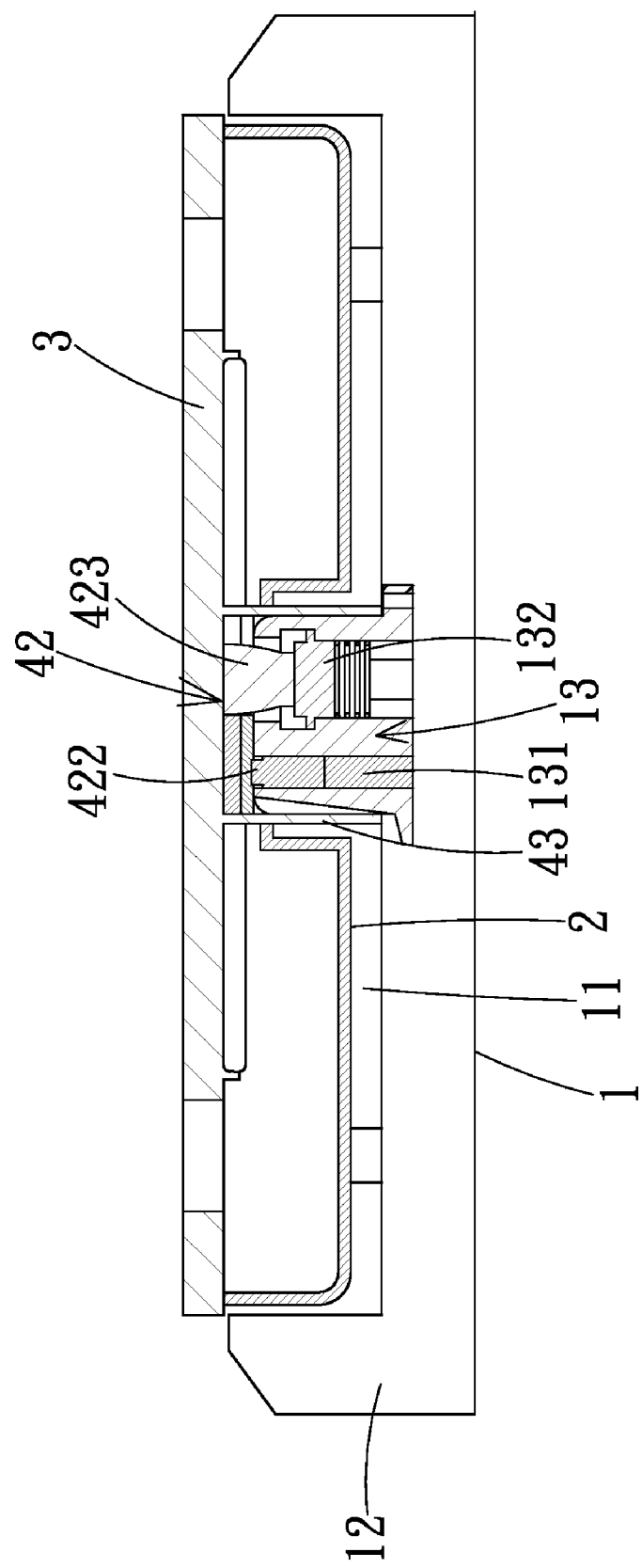
FIG. 5 shows a cross sectional view of the electric grill of FIG. 1 according to section line B-B of FIG. 3.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

An electric grill according to the preferred teachings of the present invention is shown in the drawings and generally includes a base 1, a drip pan 2, a grill plate 3, and an electric device 4. The base 1 includes a compartment 11 in an upper side thereof. A control device 12 is mounted to the base 1 and includes a circuit board and a first electrical coupling mechanism 13 adapted to be electrically connected to an external power source by a power cable 121. The circuit board includes a control circuit and at least one button. The first electrical coupling mechanism 13 is at least partially mounted above a bottom wall of the compartment 11 and includes a safety switch 131, a conductive member 132, and a terminal 133. The safety switch 131, the conductive member 132, and the terminal 133 are electrically connected to the control circuit of the circuit board by wires. The safety switch 131 is electrically connected to the power cable 121. The electric grill can operate only when the safety switch 131 is on. The conductive member 132 is electrically connected to the control circuit of the control device 12 to control the heating temperature. The terminal 133 becomes non-conductive when the temperature of the grill 3 is higher than a threshold.

The drip pan 2 is received in the compartment 11 of the base 1. The grill plate 3 is mounted above the compartment 11 of the base 1 and removable from the base 1. The drip pan 2 is mounted between the grill plate 3 and the base 1. The drip pan 2 includes an opening 21 receiving the first electrical coupling mechanism 13. The grill plate 3 includes an upper side having a surface 31 adapted to support food to be heated by the grill plate 3. The grill plate 3 further includes a plurality of through-holes 32 extending from the upper side through an underside 33 of the grill plate 3. Drippings of the food can pass through the through-holes 32 into the drip pan 2. The underside 33 of the grill plate 3 includes a groove 34. A cover 35 can be mounted on top of the grill plate 3.

The electric heating device 4 is mounted to the underside 33 of the grill plate 3 and includes an electric heating tube 41 and a second electrical coupling mechanism 42 electrically connected to the electric heating tube 41. The electric heating tube 41 is received in the groove 34 of the grill plate 3. The second electrical coupling mechanism 42 is aligned with the second electrical coupling mechanism 13 of the base 1. The second electrical coupling mechanism 42 includes a terminal 421, a contact 422, and a conductive member 423 aligned with the terminal 133, the safety switch 131, and the conductive member 132, respectively. The conductive member 423 is electrically connected to a thermal probe or temperature sensor mounted in an appropriate location for sensing the temperature of the grill plate 3. The thermal probe or temperature sensor transforms the sensed temperature into a voltage signal. The second electrical coupling mechanism 42 further includes a partitioning board 43.

When the grill plate 3 is mounted on the base 1, the second electrical coupling mechanism 42 is in electrical connection with the first electrical coupling mechanism 13 of the base 1. Furthermore, the partitioning board 43 covers the first and second electrical coupling mechanisms 13 and 42, preventing the drippings from the food or alien objects from contacting the first and second electrical coupling mechanism 13 and 42. When the second electrical coupling mechanism 42 is in electrical connection with the first electrical coupling mechanism 13, the terminal 421, the contact 422, and the conductive member 423 respectively contact the terminal 133, the safety switch 131, and the conductive member 132. The electric heating tube 41 becomes conductive when the safety switch 131 is on. The electric heating tube 41 can be controlled by the control device 12 to be conductive (so as to generate heat for heating the grill plate 3) or non-conductive (and thus can not generate heat). The voltage signal indicative of the temperature of the grill plate 3 from the conductive member 423 is sent through the conductive member 132 to the control circuit. The temperature of the grill plate 3 can be controlled by the control device 12. The electric heating tube 41 stops generating heat when the temperature of the grill plate 3 is above the threshold.

Since the electric grill according to the preferred teachings of the present invention operates only when the grill plate 3 is mounted to the base 1 to provide electrical connection between the first and second electrical coupling mechanisms 13 and 42, the electric heating tube 41 stops generating heat when the grill plate 3 is removed from the base 1, providing enhanced safety in use. Furthermore, the electric grill according to the preferred teachings of the present invention does not utilize a separate conduction control device and is easy to carry and, thus free of the risk of losing the conduction control device that may occur in conventional electric grills. The utility convenience is, thus, enhanced.

It can be appreciated that the electric grill according to the preferred teachings of the present invention can still provide the required conduction control functions under the condition that the grill plate 3 has to be mounted to the base 1 without utilizing the safety switch 131, the conductive member 132, the contact 422, and the conductive member 423. Furthermore, the drip pan 2 can be integrated into the base 1. Further, the temperature of the grill plate 3 can be detected by other provisions, and the sensed temperature can be transmitted to the control circuit by other provisions.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An electric grill comprising:
   a base including a compartment in an upper side thereof;
   a control device mounted to the base and including a first electrical coupling mechanism adapted to be electrically connected to an external power source by a power cable;
   a grill plate mounted above the compartment of the base, with the grill plate removable from the base; and
   an electric heating device mounted to the grill plate, with the electric heating device including an electric heating tube and a second electrical coupling mechanism electrically connected to the electric heating tube, with the electric heating tube being non-conductive when the grill plate is removed from the base, with the second electrical coupling mechanism being in electrical connection with the first electrical coupling mechanism and with the electric heating tube controllable by the control device to be conductive when the grill plate is mounted on the base.

2. The electric grill as claimed in claim 1, with the control device including a circuit board having a control circuit, with the first electrical coupling mechanism at least partially mounted above a bottom wall of the compartment of the base, with the grill plate including an underside to which the electric heating device is mounted, with the underside of the grill plate including a groove receiving the electric heating tube.

3. The electric grill as claimed in claim 2, with the first electrical coupling mechanism of the base including a safety switch, a first conductive member, and a terminal, with the safety switch, the first conductive member, and the terminal being electrically connected to the control circuit, with the safety switch electrically connected to the power cable, with the first conductive member electrically connected to the control circuit to control a heating temperature of the electric heating tube, with the second electrical coupling mechanism including a contact and a second conductive member, with the contact contacting the safety switch and with the second conductive member contacting the first conductive member when the grill plate is mounted to the base and when the second electrical coupling mechanism is in electrical connection with the first electrical coupling mechanism, with the second conductive member capable of transmitting a signal indicative of a temperature of the grill plate through the first conductive member to the control circuit.

4. The electric grill as claimed in claim 3, with the second electrical coupling mechanism including a partitioning board, with the partitioning board covering the first and second electrical coupling mechanisms when the grill plate is mounted to the base and when the second electrical coupling mechanism is in electrical connection with the first electrical coupling mechanism.

5. The electric grill as claimed in claim 1, with the grill plate including an upper side having a surface adapted to support food to be heated by the grill plate, with the grill plate further including a plurality of through-holes extending from the upper side through the underside, with the electric grill further including a drip pan mounted between the grill plate and the base, with the drip pan including an opening, and with the opening receiving the first electrical coupling mechanism.

* * * * *